Patented Oct. 26, 1943

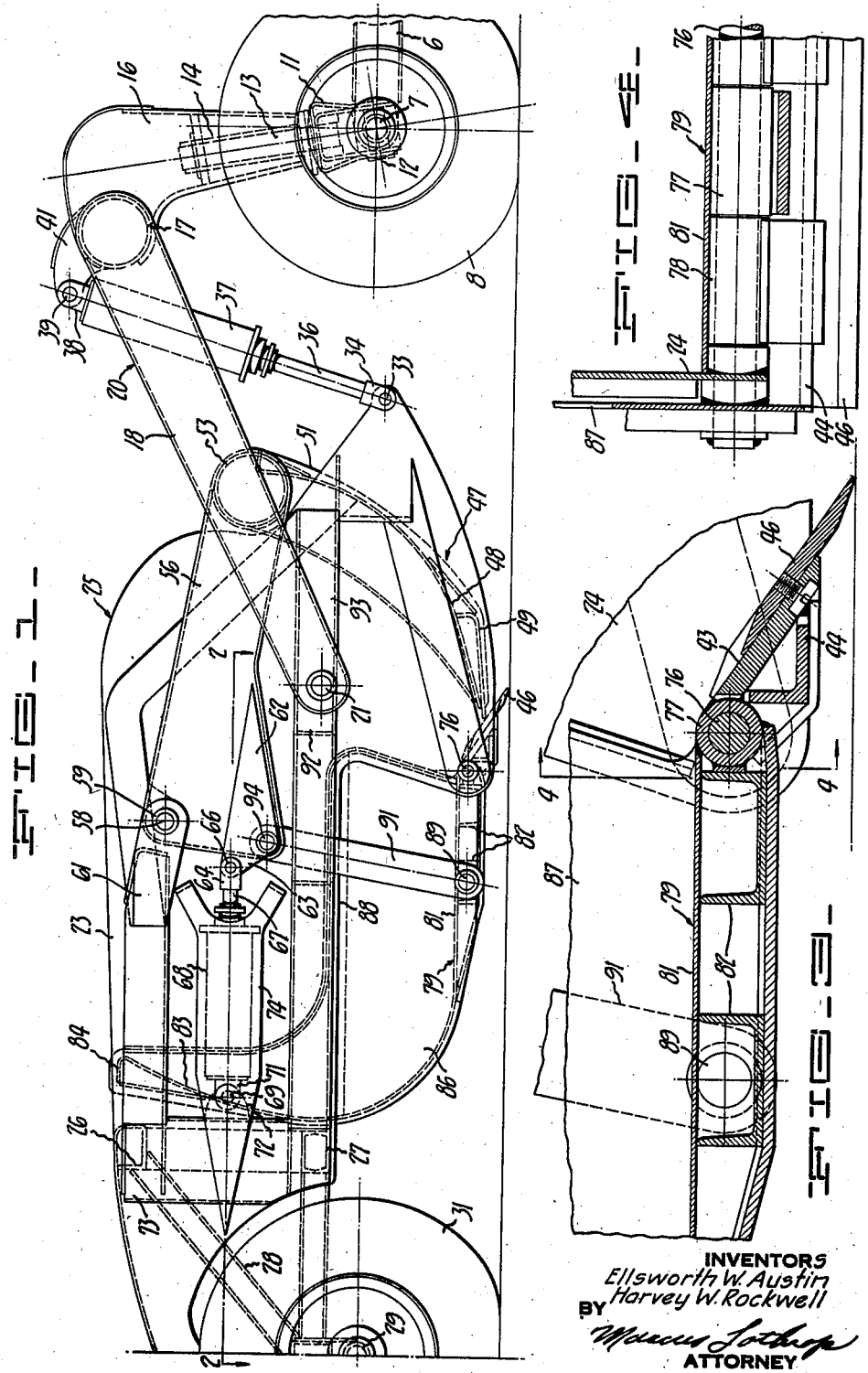

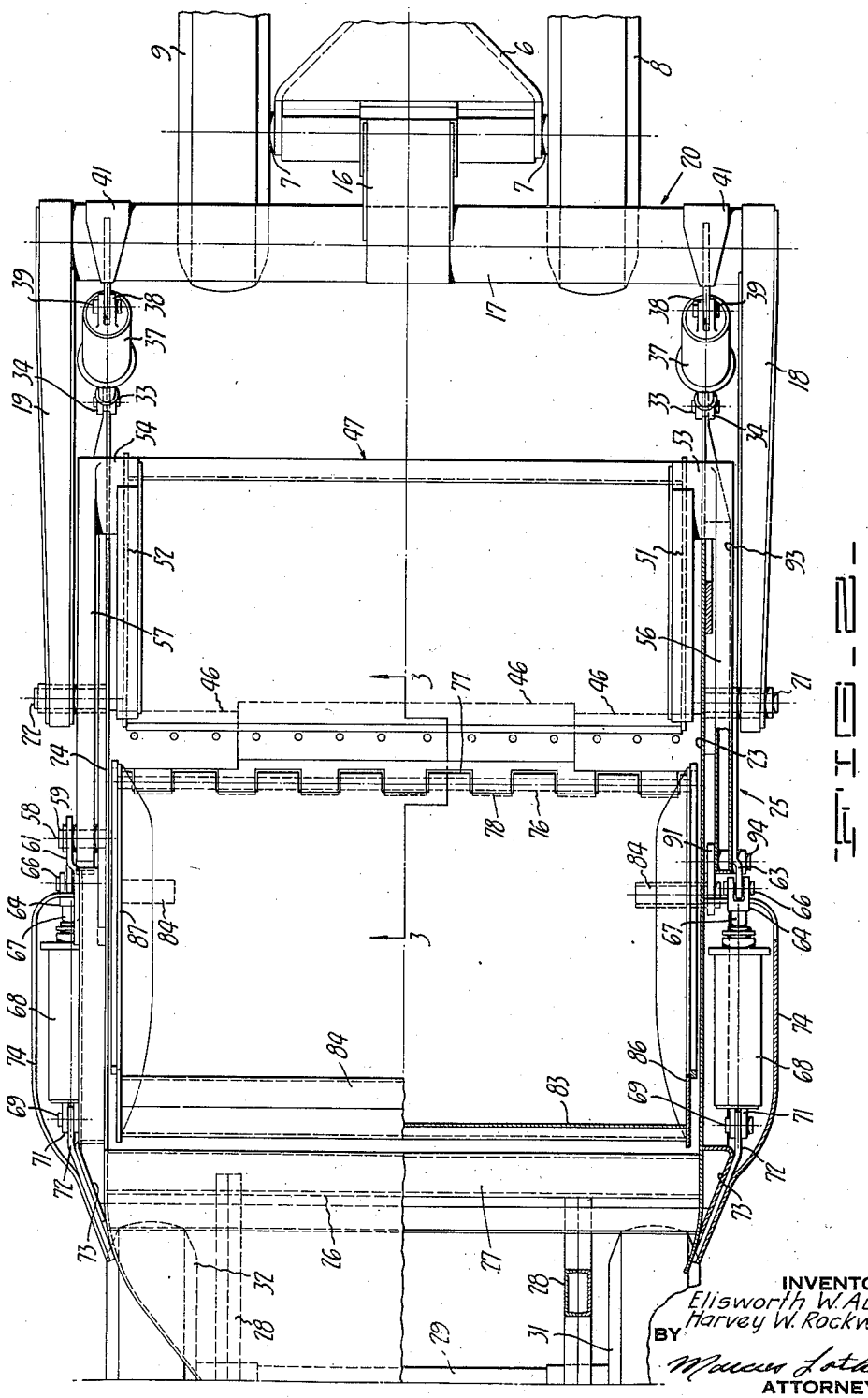

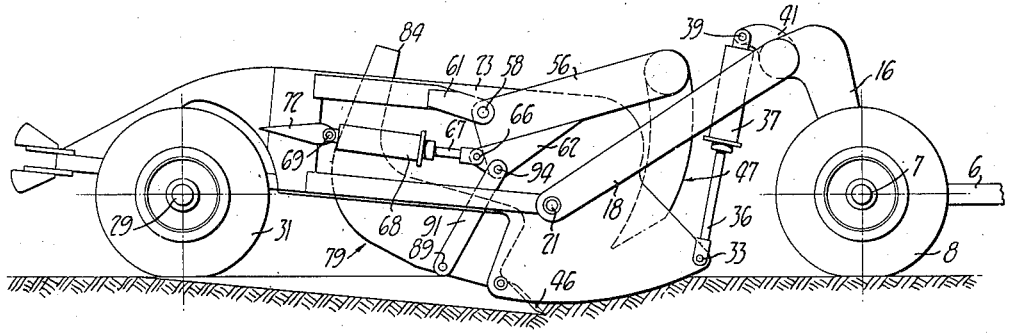
FIG_5_
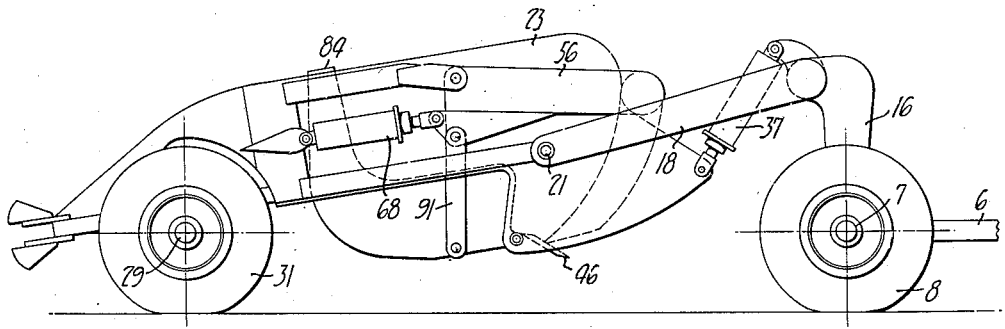
FIG_6_
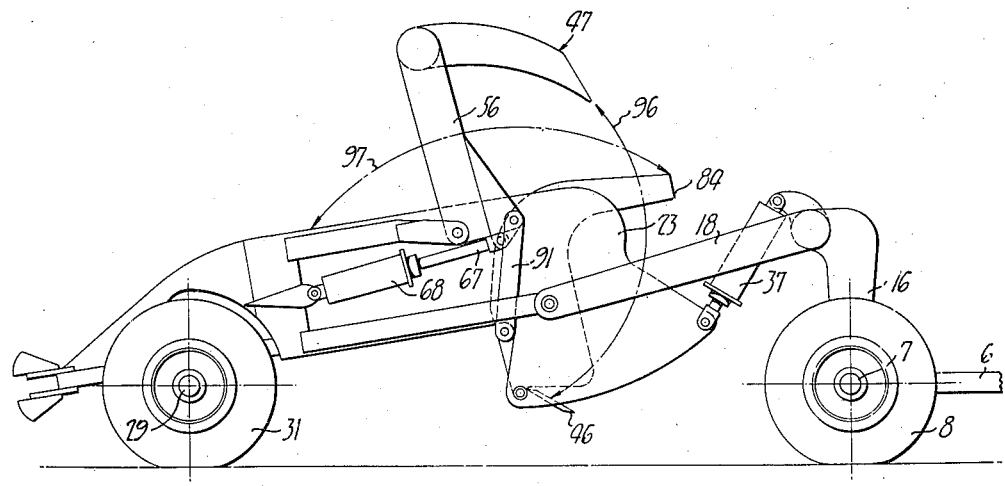
FIG_7_

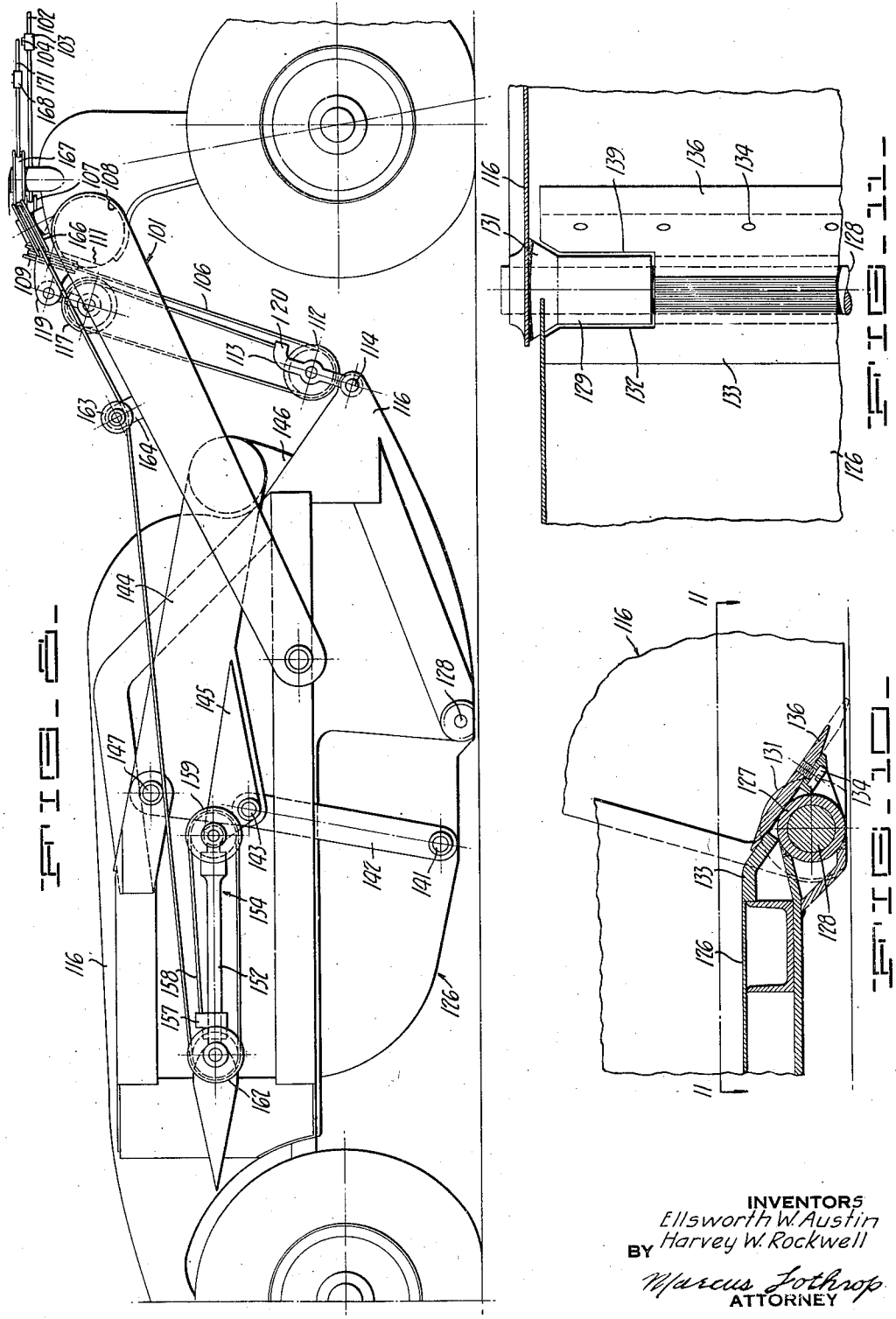

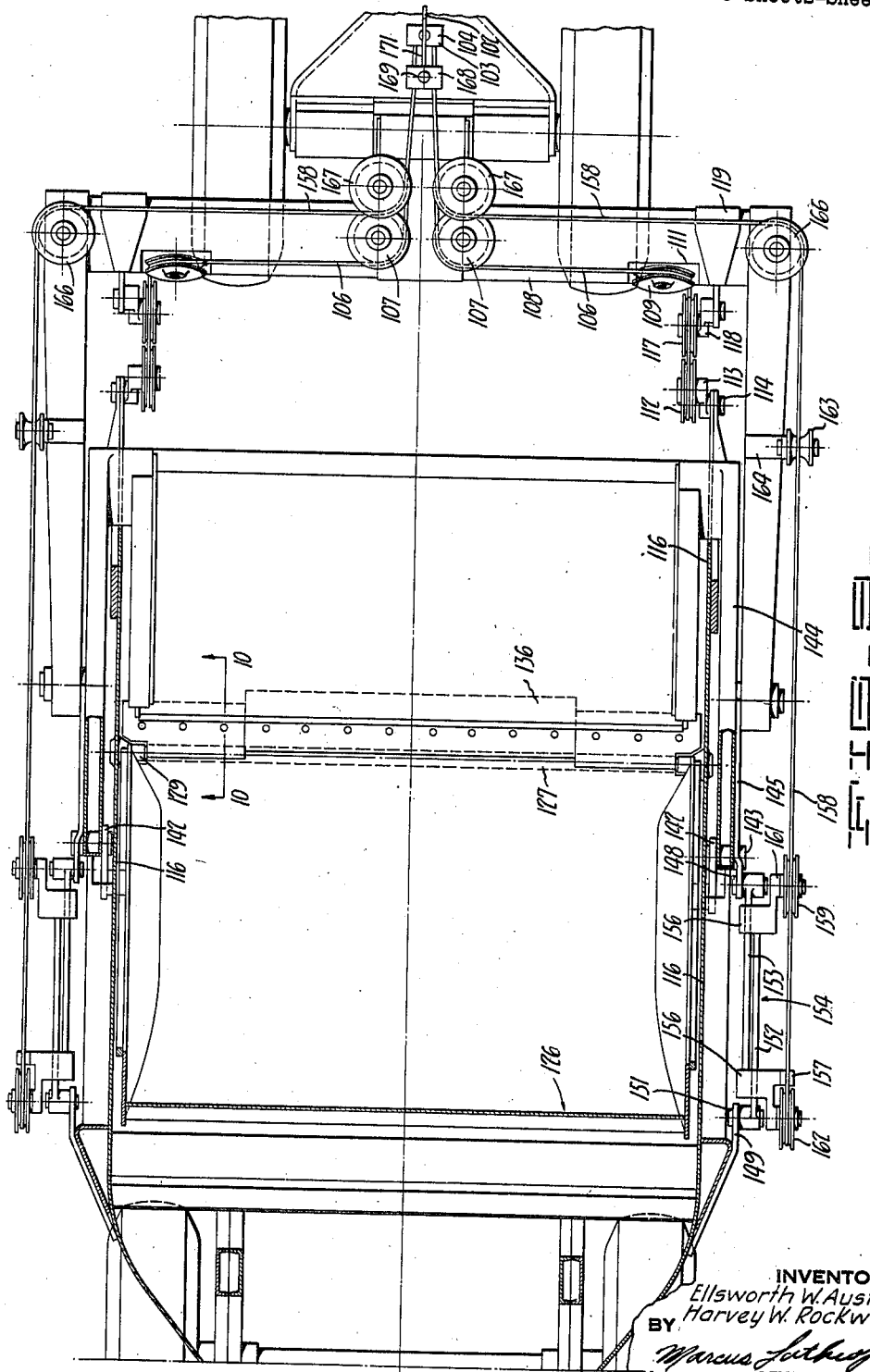

2,332,686

UNITED STATES PATENT OFFICE 2,332,686

EARTH MOVER

Ellsworth W. Austin and Harvey W. Rockwell, Cedar Rapids, Iowa, assignors to La Plant-Choate Manufacturing Company, Incorporated, Cedar Rapids, Iowa, a corporation of Delaware Application March 28, 1941, Serial No. 385,677

15 Claims. (Cl. 37—126)

Our invention relates to a machine adapted to be drawn or propelled by a suitable means, usually a draft vehicle, and capable of excavating, transporting and discharging earth-like material.

It is an object of our invention to provide an improved earth mover.

Another object of our invention is to provide an earth mover which is simple to construct and maintain.

Another object of our invention is to provide an earth mover which positively discharges its contents, yet has a greatly simplified discharging mechanism.

The foregoing and other objects are attained in the embodiment of the invention illustrated in the drawings, in which—

Fig. 1 is a side elevation of one form of earth mover constructed in accordance with our invention, portions being broken away to reduce the size of the figure.

Fig. 2 is on the left half a plan of the earth mover of Fig. 1, and on the right hand is generally a plan, but is partly a section, the plane of which is indicated by the line 2—2 of Fig. 1.

Fig. 3 is a cross-section showing in detail and to an enlarged scale the leading edge of the pan, the plane of section being indicated by the line 3—3 of Fig. 2.

Fig. 4 is a fragmentary cross-section related to Fig. 3 and the plane of which is indicated by the lines 4—4 of Fig. 3.

Fig. 5 is a side elevation of the mechanism of Fig. 1 in digging position.

Fig. 6 is a side elevation of the mechanism of Fig 1 in carrying position.

Fig. 7 is a side elevation of the mechanism of Fig. 1 in fully discharged position.

Fig. 8 is a side elevation of a modified form of earth mover, substantially the same as in Fig. 1, but utilizing cable operation.

Fig. 9 is a plan of the earth mover shown in Fig. 8.

Fig. 10 is a fragmentary cross-section on an enlarged scale, showing the leading edge of the pan of the modification, the plane of section being indicated by the lines 10—10 of Fig. 9.

Fig. 11 is a detail in cross-section, the plane of which is indicated by the line 11—11 of Fig. 10.

In its preferred form the earth mover of our invention comprises a pair of side walls and a frame together articulated for movement over the ground, and provided with a main bowl or pan situated between the side walls and adapted to pivot thereon about an axis adjacent its leading edge from a load carrying position to a load discharging position. Also included, is a front apron mounted on the side walls to move toward and away from the leading edge of the pan, and being connected therewith preferably by a link pivoted both to the pan and to the front apron, so that when force is exerted on the front apron to open it, the pan is likewise moved into discharging position and so that when the weight of the apron is free to close it, such closing movement is likewise transmitted to the pan to return it to load carrying position.

With special reference to Figs. 1 to 7 inclusive, the form of our earth mover disclosed therein is designed to be trailed behind a power vehicle, such as a tractor, not shown, to which the earth mover is connected by a draft tongue 6. The tongue is mounted to pivot on a transverse front axle 7 supported on a pair of front ground engaging wheels 8 and 9 and is provided with a kingpin frame 11 secured to the axle by a longitudinally extending pivot 12. An upstanding but rearwardly inclined kingpin 13 extends from the frame 11 and is journaled within a coaxial sleeve 14 disposed within a mast 16 fabricated of suitable metal shapes. The mast 16 is centrally disposed and engages the middle of a transverse frame tube 17 extending considerably beyond the tread of the wheels 8 and 9 and having its extremities merging with a pair of side beams 18 and 19, which with the preceding structure are included in the front frame, generally designated 20.

The front frame side beams are designed to be connected by pivot pins 21 and 22 to adjacent parallel side plates 23 and 24, which may be considered as part of the rear frame, generally designated 25, of the structure and which extend rearwardly with appropriate cross braces 26 and 27 and structural connections 28 to a rear axle 29 on which are journaled rear ground engaging wheels 31 and 32.

With the arrangement described, the rearward portion of the vehicle is designed to pivot or to be articulated for motion about the axis of the rear wheels 31 and 32 while the front frame is designed to pivot about the axis of the front wheels 8 and 9, the relative movement between these two parts being centered about the axis of the pivots 21 and 22. In order to control the relative pivotal movement of the two parts of the vehicle about the transverse horizontal axis, operator controlled power means are provided. Each of the side walls 23 and 24 adjacent its forward end terminates in an aperture to receive a pivot pin 33 for detachably securing in place a clevis 34 at the lower end of a piston rod 36.

The upper end of this piston rod carries a piston (not shown) adapted to reciprocate in a cylinder 37, the upper end of which is provided with a pair of ears 38 secured by a pivot pin 39 to a bracket 41 extending from the frame tube 17. The cylinder 37 on opposite sides of the piston therein is supplied with or relieved of hydraulic fluid under pressure in accordance with standard practice not necessary herein to describe. However, the hydraulic structure is effective either to raise the pivotal axis 21—22 with respect to the ground, or to lower it with respect thereto entirely under the control of the operator, who likewise can lock fluid within the cylinder 37 so that the position of the axis 21 and 22 with regard to the ground, remains established or fixed. In effect, therefore, when the cylinder 37 is not operated the entire structure is substantially fixed or rigid and the side walls 23 and 24 along with the beams 18 and 19 can be considered as part of the main frame.

In order to provide means for cutting or loading earthlike material, we preferably span the space between the sidewalls 23 and 24 by an inclined plate 43 which is reinforced by an angle 44 and is preferably rigidly attached to the side walls to serve as a transverse brace therefor. On the plate 43 we removably position, preferably in staggered relationship, several reversible cutting edges 46. As the frame is advanced over the ground with the cutting edge 46 penetrating the earth, material is loosened and discharged rearwardly over the cutting edge.

Also, some material is displaced forwardly of the cutting edge 46 during excavation, and particularly during the latter part of the loading operation, and to assist in retaining such material, we provide a front apron or auxiliary bowl generally designated 47. This instrumentality is located preferably ahead of the cutting edge 46 and is generally disposed between the forward portions of the side walls 23 and 24. The auxiliary bowl or front apron preferably is constituted by a curved interior plate 48, having some exterior reinforcements 49 thereon and being bounded on its edges by a pair of parallel walls 51 and 52 which lie adjacent but between the walls 23 and 24. The upper portion of the curved plate 48 and of the side walls 51 and 52 are all joined, preferably by welding, to stub tubes 53 and 54 respectively, which overlie the upper edges of the side plates 23 and 24. The stub tubes are connected as by welding to side arms 56 and 57 disposed on the exterior of the side plates 23 and 24 and terminating on a common axis 58 considerably above and slightly to the rear of the cutting edge 46. Each of the arms 56 and 57 is carried by the adjacent one of a pair of pivot pins 59 extending from the associated one of the side walls 23 and 24 and stabilized by a strap 61. With this construction, while the front apron 47 is entirely disposed between the side walls 23 and 24, its actuating arms 56 and 57 are outside of the side walls and in nowise interfere with any load therein. Furthermore, the side arms 56 and 57 are located between the forward frame arms 18 and 19 so that the pivotal operation of the forward frame to raise and lower the cutting edge does not interfere with the operation of the front apron.

In order to position the front apron by power means, we provide on each of the arms 56 and 57 a somewhat triangular extension 62 on which a lug 63 is secured and to which is connected a clevis 64 by a pivot pin 66 on the end of a piston rod 67. A piston (not shown) on the piston rod 67 reciprocates within a cylinder 68 supported by a pivot pin 69 engaging ears 71 on the end of the cylinder and likewise engaging a bracket 72 extended from a pad 73 on the rear framework 27 of the machine. A guard 74 extends around the cylinder 68 in order to protect it from injury in collision. The two cylinders 68 on opposite sides of the vehicle are connected to conventional hydraulic structure in such a way that the pistons therein are positively propelled in either direction or are locked in position under the control of an operator.

When the piston rods 67 are withdrawn into the cylinder 68 the arms 56 and 57 are moved into positions alongside the side walls 23 and 24 and the front apron 47 is moved into its lowermost closed position with its trailing edge immediately adjacent the cutting edge 46. When the cylinders 68 are operated to extend the piston rods 67, the arms 56 and 57 are rotated counter clockwise as seen in Fig. 1 so that the front apron 47 sweeps through an arc to lie substantially in a position above the cutting edge 46. Whatever material is contained in the front apron is gravitally released as the apron ascends.

In accordance with our invention we also provide means for retaining a load received over the cutting edge 46 in a position behind said cutting edge. Adjacent the angle 44 and spanning the distance between the side walls 23 and 24, we provide a pivot rod 76, the axis of which is parallel with the axis of the pins 21 and 22 and is immediately behind the cutting edge 46. Alternating transversely along the pivot rod 76 are sleeves 77 and 78 alternately secured forwardly to the plate 43 and rearwardly to a pan 79. Thus, a pivotal hinge connection is provided for the pan with respect to the side walls 23 and 24. The pan is preferably constituted by a bottom plate 81 adjacent its lower forward portion provided with reinforcements 82 and adjacent its rearward portion being gradually curved upwardly to provide a rear wall 83, terminating in an upper reinforced edge 84.

Adding to the stiffness of the pan and assisting the pan to retain an earth load are side walls 86 and 87 which can, if desired, be considered as part of the pan. The walls are secured to the side edges of the bottom plate 81, and also along the rear wall 83, in part to overlap the side walls 23 and 24, and in part to occupy certain cutaway portions 88 of each of the side walls 23 and 24. Considered together, the side walls 86 and 87, together with the side walls 23 and 24, laterally confine earth upon the pan bottom 81. The rear portions of the side walls 23 and 24 are cut away not only to afford substantial ground clearance for the rear part of the machine in negotiating embankments such as levees, but also to provide a free path for pivots 89, one of which is disposed on each side of the pan and which are in transverse axial alinement parallel with the axis of the pivot rod 76.

Means in accordance with our invention engage the pan 79 to insure that the motion of the pan is synchronous with the motion of the front apron 47 and so that when the cylinders 68 are operated not only will the front apron be raised, but the pan 79 will likewise be tipped from its load carrying to its load discharging position. The means also operate so that loads on the pan 81 will assist in drawing the front apron 47 into its closed position to assist in severing roots and the like which overlie the cutting edge 46, and so that when the front apron 47 is in its fully opened position and the pan 79 is in its maximum tilted position, the weight of the front apron will be sufficient to restore the parts to their carrying or closed positions.

To accomplish all of these objects, the pivots 89 are each provided with a link or strut 91, which is a strap or bar of considerable rigidity in both compression and tension extending generally upwardly from the pins 89 through appropriate slots 92 provided in the side wall reinforcing members 93, which extend for substantially the length of each of the side walls 23 and 24.

Each link 91 terminates in a journal on a pivot pin 94 secured in the extension 62 of the adjacent one of the arms 51 and 52. As shown especially in Figs. 1 and 6, when the front apron 47 is closed and the pan 79 is in its carrying position, the pivotal axes of the pins 89, 94 and 58 are substantially in a straight line so that the links 91 form part of a locking toggle to maintain the parts in closed position for transport of a load without danger of dislodgement.

For excavating, however, the cylinders 68 are operated to advance the piston rods 57 a portion of their total travel so that the front apron 47 is raised part way, for example, into the position shown in Fig. 5, and this motion transmitted through the links 91 likewise rotates the pan 79 partly about the axis of the rod 76 at the leading edge of the pan, so that the bottom plate 81 is at an appropriate angle to receive the excavated material, portions of which roll forwardly against the plate 48 of the front apron.

After a load has been acquired the machine is moved from the position shown in Fig. 5 through the carrying position shown in Fig. 6 and into its discharging position illustrated in Fig. 7. In this position the cylinders 68 are filled with hydraulic fluid to expel the piston rods 67 completely so that the front apron 47 moves from its lowermost closed position in a curved path into its maximum open discharging position as shown in Fig. 7; the trailing edge of the front apron 47 describing an arc 96 (Fig. 7), during this time. Whatever load is within the front apron 47 spills gravitally. At the same time the link 91 is placed in tension and the pan 79 is rotated clockwise, as seen in these figures, about the axis of the rod 76 adjacent the leading edge of the pan, so that the bottom plate 81 moves from a substantially horizontal position into a substantially vertical position. All or part of the load discharges from the pan 79 gravitally. Whatever portion thereof tends to adhere to the side walls 23 and 24, is positively ejected by the sweeping of the pan 79 thereby.

In addition, during this tipping movement of the pan, the upper trailing edge 84 thereof moves in an arcuate path 97 (Fig. 7) which passes immediately beneath the path 96 of the front apron 47 and the pan 79 itself sweeps between the side arms 51 and 52, so that adhering material on the interior of the front apron 47 is positively ejected by the tipping pan. Thus, the tipping pan acts as a positive ejector, not only for material within the main bowl between the side walls 23 and 24, but likewise acts as a positive ejector for material within the front apron 47.

While the hydraulic cylinders 68 themselves when actuated are capable of exerting force on the arms 56 and 57 and through them on the links 91 to restore the parts, including the front apron and the pan to a loading or transporting position, we preferably arrange it so that as shown in Fig. 7, when the front apron 47 is in its maximum open position, the center of gravity thereof is sufficiently far ahead of this pivotal axis 58 to exert a gravital clockwise turning movement tending to compress the links 91 and drive them downwardly. The center of gravity of the pan 79 in this position may be slightly ahead of or perhaps behind its own pivotal axis 76, but the relationship of the front apron to the main bowl is such that even if the hydraulic cylinders 68 are inactive, or so long as they do not interpose substantial resistance, the gravital rotation of the front apron 47 will be sufficient to start, at least, the counterclockwise rotation (Fig. 7) of the main pan toward its closed or carrying position. After the parts have gone partially toward their carrying or closed position, gravity is effective upon both of them to move them into closed position.

This same effect adjacent closed position of the front apron and main pan is especially augmented by the weight of the load or part of the load on pan 79. Often, particularly when the pan is substantially filled with earthy material, which contains a large number of roots or similar obstructions which overlie the cutting edge 46 and sometimes also in sandy country, it is very difficult to close the front apron 47 satisfactorily. But with the present linkage the center of action of the load on the main pan 79 is materially behind the pivotal axis 76, and tends to rotate the main pan counterclockwise, as seen in the figures, thereby exerting tension through the links 91 upon the arms 56 and 57 of the front apron 47 to force the front apron closed and to cause the trailing edge thereof to act substantially as a cutter against the cutting edge 46, thereby insuring a positive closure or approaching movement of these elements.

Under some conditions of operation it is deemed preferable to dispense with hydraulic actuation of the various moving instrumentalities, and to utilize a cable operation instead. The structure as previously described is readily adaptable to this change, and in fact, as shown in Figs. 8 to 11 inclusive, we have provided means for readily interchanging cable operating devices for hydraulic cylinder devices. In addition, we have changed the mounting of the cutting edge so that the angle of the cutting blade can be varied between rather wide limits to facilitate the excavation of material under differing conditions encountered in practice.

The earth mover generally is substantially the same as previously described, including a front frame 101 supported as before, behind a tractor which is provided with the customary cable handling mechanism under the operator's control, so well standardized that it is not herein illustrated. From such an operating station, however, extends a cable 102 which is not directly reeved through any of the earth mover instrumentalities, but preferably is detachably secured into a clamp block 103, the attachment being effectuated by a clamp bolt 104, for example. Extending from the clamp block 103 are two identical cable circuits arranged symmetrically on opposite sides of the longitudinal center line of the machine, so that but one of them need be described. For example, a cable 106 extends centrally and rearwardly to pass around a pulley 107 upstanding from a frame tube 108, and thence extends around a pulley 109 arranged approximately in a vertical position and mounted in a recess 111 in the frame tube. The cable 106 then extends around a pulley or sheave block 112 journaled in a frame 113, connected by a pivot pin 114 to the nearest one of a pair of side walls 116, which side walls at their opposite ends are mounted on rear supports as previously described. From the block 112 the cable 106 then extends around a pulley block 117 suspended from a link 118 fastening to the bracket 119 extending from the frame tube 103. The terminal run of the cable 106 is deadened at 120 to the frame 113. The bracket 119 is identical with the bracket 41 in the previous modification and the link 118 fits exactly where the pivot 39 fitted, whereas the frame 113 is secured by a pin 114, identical with the pin 33.

By removing and subsequently replacing the appropriate pivot pins, the hydraulic mechanism can be removed from the structure and the cable mechanism can be substituted. The pulleys 107 and 109 can either be furnished with the machine originally and not utilized on hydraulic structure supplied, or can readily be attached in appropriate mounting spaces if the hydraulic structure is later replaced by cables. In either event, ready interchangeability from hydraulic operation to cable operation is provided. When the main cable 102 is tensioned, the block 103 is translated toward the right in Fig. 8, and both of the cables 106 (the lefthand one and the righthand one) are simultaneously taken up so that both sets of the pulleys 112 and 117 are made to approach each other. Consequently, the side walls 116 and the frame 101 are pivoted with respect to each other. Correspondingly, when the cable 102 is paid out, a reverse motion occurs. It may be especially noted that there is no cable equalization between opposite sides of the vehicle and also that the cable 102, which extends from the winch mechanism on the tractor (not shown), is separate and distinct from either of the cables 106.

In a somewhat similar fashion cable connections are provided for operating the tipping pan. The pan itself, 126, is for the most part identical with the pan previously described, but at its forward end is provided with a central pivot tube 127 encompassing a pivot bar 128 which extends transversely of the side walls 116 and at its ends is received in stationary bearing sleeves 129 secured therein by reinforcing collars 131. Thus, the bar 128 forms a rigid connection between the walls 116 on which it is adequately supported. The tube 127 is rotatable about the bar, but terminates somewhat short of the complete interior span of the structure, a portion of the pan 126 being cut away as at 132, to accommodate the bearing 129. Also movable with the tube 127 is an angle plate 133 to which is secured by removable fastenings 134, a cutting edge 136, which can be made in a plurality of portions as previously described, but which in the present instance, instead of being rigid or stationary with regard to the side walls 116, is movable with the pan 126 to rotate about the axis of the bar 128. The cutting edge 136 likewise has a cutaway portion 139 to accommodate the bearings 129 so that as the pan 126 is tipped the cutting edge assumes various angles with respect to the ground.

The cutting edge is kept relatively short and fairly close to the axis of the bar 128 so that in maximum discharging position the variation in the location of the cutting edge will not unduly change the depth of spread. By having the cutting edge relatively short and close to the axis of the bar 128, the digging forces which tend to rotate the cutting edge and therefore the pan 126, are exerted with a short moment arm readily resisted by the long moment arm of the pan 126. These forces are further resisted since the pan 126 is connected by a pivot 141 to a link 142, also connected by a pivot 143 to one of the side arms 144 of a front apron 146. The side arms are related to the side walls 116 by pivot pins 147 and this portion of the structure generally is identical with that previously described. Consequently, each of the side arms 144 has a depending portion 145 corresponding to the portion 63 and has a terminal to receive a pivot pin 148 identical with the pin 64. Furthermore, the side walls 116 each have a stationary eyelet 149 to receive a pivot pin 151 corresponding exactly with the pivot pin 69.

Adapted to be positioned by the pins 151 and 148, on opposite sides of the machine, are telescoping extensible members 152 and 153 respectively, each of which includes a slide 154 and a guide member 156. One of the guides, 156, is provided with an extension 157 serving as an anchor for an actuating cable 158, which extends from such anchor around a pulley 159 journaled on an extension 161 of the other guide 156. From the pulley 159 the cable 158 extends rearwardly and around a pulley 162 journaled on the extension 157, and thence the cable 158 passes around a guide pulley 163, secured to a bracket 164 mounted on the frame 101 and then is directed by a pulley 166 upstanding from and journaled on the frame 101. A pulley 167 again directs the cable 158 to an anchor block 168, including a fastening 169, so that the anchor block 168 receives the other or left hand cable 158 and also detachably receives the actuating cable 171 which extends from an operator controlled cable winch on the tractor (not shown).

By this means, therefore, each of the sides of the structure is provided with a cable actuated extensible mechanism which is readily positioned in place of the hydraulic mechanism, but produces substantially the same operation, the cable on each side being joined with its symmetrical counterpart in the anchor block 168, which detachably receives the master cable 171 from the tractor. With this arrangement there is no cross-equalization of the actuating cable transversely of the machine, and also there is no necessity for threading the tractor cable 171 through various pulleys and other instrumentalities on the earth mover. It is only necessary to operate the fastening 169 in the anchor block to fasten or release the master cable 171. The operation of this structure is substantially the same as with the hydraulic arrangement, and in fact it is intended that the cable operation and the hydraulic operation can be applied interchangeably.

We claim:

1. An earth mover comprising a pair of side walls, rear wheels supporting said side walls, a frame pivoted on said side walls, means supporting said frame, means for varying the pivotal relationship between said side walls and said frame, a pan disposed between said side walls, means mounting said pan to pivot on said side walls about a transverse axis adjacent the leading edge of said pan, a front apron mounted on said side walls to pivot about a second transverse axis for movement toward and away from said leading edge, and means compelling said pan and said front apron to move only in unison.

2. An earth mover comprising side walls, ground-engaging wheels directly connected to said side walls, a pan, means supporting said pan upon said walls to move between a substantially horizontal load retaining position and an inclined load discharging position, a front apron, means supporting said front apron upon said walls to move between a lower load retaining position and an upper load discharging position, and means for compelling said front apron always to move in unison with said pan throughout its entire range of movement from said load discharging position toward said load retaining position as said pan moves from said load discharging position toward said load retaining position.

3. An earth mover comprising a pair of side walls, a pan disposed between said side walls, means supporting said pan upon said side walls to tip about a transverse axis adjacent the leading edge of said pan, a front apron disposed ahead of said leading edge, means supporting said apron upon said side walls to move toward and away from said edge, means applied to said apron to move said apron away from said edge, and means for transmitting said movement of said apron to said pan to tip said pan.

4. An earth mover comprising a side wall, a pan pivoted adjacent its leading edge on said side wall and adapted to sweep the inside of said wall, a front apron pivoted on said side wall and adapted to sweep the inside of said wall, a link on the outside of said wall, and means for connecting said link to said pan and to said front apron.

5. An earth mover comprising a side wall having a cut away portion, a pan pivoted adjacent its leading edge on said side wall, a side on said pan adapted substantially to fill said cut away portion, a pivot on said pan adapted to swing within said cut away portion, and means for moving said pan connected to said pivot.

6. An earth mover comprising a side wall having a cut away portion, rear wheels for supporting said side wall, a frame connected to said side wall, means for supporting said frame, a pan pivoted on said side wall, a side on said pan adapted substantially to fill said cut away portion and to sweep over the inside of said wall, a front apron pivoted on said side wall and adapted to sweep over the inside of said wall, and a link on the outside of said wall connecting said pan and said apron.

7. An earth mover comprising a support, a pan pivotally mounted on said support to turn about a transverse axis, a front apron pivotally mounted on said support, means for rotating said front apron into a position above said axis, and means for rotating said pan to sweep beneath said apron.

8. An earth mover comprising a pair of side walls, a frame pivoted on said side walls, means for supporting said frame and said side walls from the ground, means for pivotally moving said frame with respect to said side walls, a pan disposed between said side walls and pivoted thereto on a transverse axis adjacent the leading edge of said pan, walls on said pan between said side walls, a front apron disposed between said side walls and having arms pivoted thereto, extensible members fastened to said side walls and to said arms for pivotally moving said front apron with respect to said side walls, and links pivotally connected to said arms and to said pan.

9. An earth mover comprising a pair of side walls, a frame pivoted on said side walls, means for supporting said frame and said side walls from the ground, means for pivotally moving said frame with respect to said side walls, a pan disposed between said side walls and pivoted thereto on a transverse axis adjacent the leading edge of said pan, walls on said pan between said side walls, a front apron disposed between said side walls and having arms pivoted thereto, extensible members fastened to said side walls and to said arms for pivotally moving said front apron with respect to said side walls, links outside of said side walls, pivots connecting one end of each of said links and said pan, and pivots connecting the other end of said links and said arms.

10. An earth mover comprising a frame including a pair of earth supporting side walls, ground-engaging wheels directly mounted upon said side walls, an earth supporting pan between said side walls and pivotally mounted thereon to sweep over said side walls about a horizontal axis transversely thereof, an earth supporting front apron pivoted on said side walls and having a portion disposed ahead of said axis, and a link having one end portion pivoted to said pan and having another end portion pivoted to said front apron.

11. An earth mover comprising a mobile frame including a pair of earth supporting side walls, an earth supporting pan between said side walls and pivotally mounted thereon to sweep over said side walls about a horizontal axis transversely thereof, an earth supporting front apron pivoted on said side walls and having a portion disposed ahead of said axis, a motion transmitting connection between said pan and said apron, and means applied to said apron for moving said apron and through said connection also moving said pan.

12. An earth mover comprising a mobile frame including a pair of earth supporting side walls, ground-engaging wheels directly connected to said side walls, an earth supporting pan between said side walls and pivotally mounted thereon to sweep over said side walls about a horizontal transverse axis, an earth supporting front apron pivoted on said frame and having a portion disposed ahead of said pan, a link having a pair of circular apertures therein, a pivot pin on said pan operating within one of said apertures, and a pivot pin on said apron operating within the other one of said apertures.

13. An earth mover comprising side walls, a pan disposed between said walls, means for supporting said pan upon said walls to turn between a lower position and an upper position about a transverse first axis adjacent the leading edge of said pan, a front apron disposed ahead of said pan, means for supporting said apron upon said walls to turn between a lower position and an upper position about a second axis parallel to and approximately over said first axis, a link, a first pivot connecting said link to said pan at a predetermined point which in the lower position of said pan is behind said first axis, and a second pivot connecting said link to said apron at a point which in the lower position of said apron is above said predetermined point and is below said second axis.

14. An earth mover comprising a mobile frame including a pair of fixed earth supporting side walls, an earth supporting pan between said side walls, means mounting said pan on said side walls to turn about a first axis, an earth supporting front apron, means mounting said front apron on said side walls to turn about a second axis approximately over said first axis, and a link at one end pivoted to said pan at a predetermined point and at the other end pivoted to said apron at a second predetermined point, said first and second predetermined points and said second axis being in substantially a straight line in one position of the parts.

15. An earth mover comprising a mobile frame including a pair of fixed earth supporting side walls, an earth supporting pan between said side walls, means pivotally mounting said pan on said side walls, an earth supporting front apron having a portion disposed to extend between said side walls and having support arms on the outside of said side walls, means pivotally mounting said side arms on said side walls, a link, a pivotal connection between one end of said link and one of said side arms, and a second pivotal connection between the other end of said link and said pan, said second connection being disposed to operate beneath the adjacent one of said side walls.

ELLSWORTH W. AUSTIN.
HARVEY W. ROCKWELL.